Sept. 8, 1942.    P. W. BROWER    2,295,154
DRAIN VALVE
Filed June 7, 1941    2 Sheets-Sheet 1

INVENTOR.
PAUL W. BROWER
BY Joseph B. Lindecker
ATTORNEY.

Sept. 8, 1942.  P. W. BROWER  2,295,154
DRAIN VALVE
Filed June 7, 1941  2 Sheets-Sheet 2
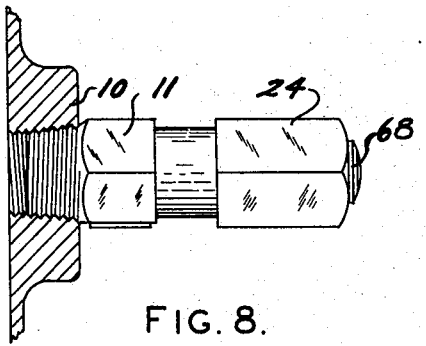
FIG. 8.
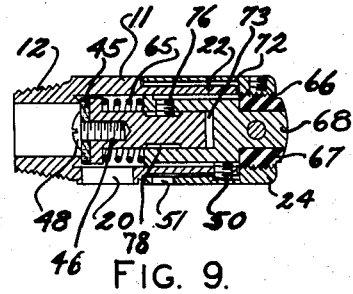
FIG. 9.
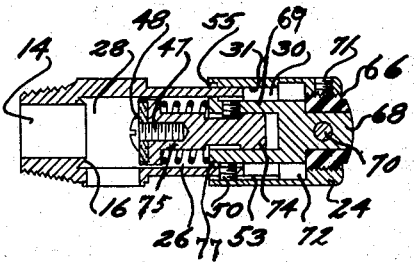
FIG. 10.
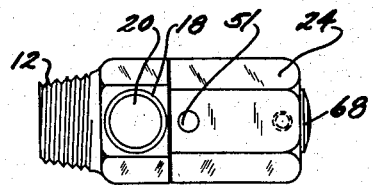
FIG. 11.
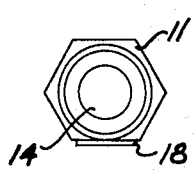
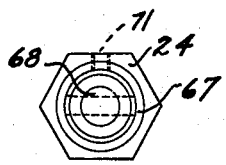
FIG. 12.  FIG. 13.
INVENTOR
PAUL W. BROWER.
BY
Joseph B. Lindecker
ATTORNEY.

Patented Sept. 8, 1942

2,295,154

UNITED STATES PATENT OFFICE 2,295,154

DRAIN VALVE

Paul W. Brower, Toledo, Ohio

Application June 7, 1941, Serial No. 397,111

15 Claims. (Cl. 137—53)

This invention relates to improvements in regulating type of safety drain valves.

One of the objects of the invention is to provide a safety valve specially designed to be used in drain valves for use with containers or reservoirs where air of high pressure or other fluids can be drained from said containers in a quick fashion or in an adjustable manner. My improved drain valve includes a valve actuator slidably mounted within a cylindrical guide and yieldingly connected with a valve adapted for engagement with a valve seat, and serving to seat said valve with a predetermined maximum pressure, said valve being effective to permit escape of high pressure air or other fluids from a container under any pressure thereagainst in excess of such maximum pressure, thus operating as a safety or relief valve while at the same time it performs the functions of a drain valve.

A further object of my invention is to provide a drain valve which is opened and closed manually as by means of a threaded cylinder head advancing longitudinally upon the body of said valve, said head having an actuating member yieldingly connected to a valve. The movement of the cylinder head and actuator is capable of opening and closing said valve, and is wholly independent of a fixed adjustment or an adjustable means internally of the valve body.

A still further object of my invention is to provide a container safeguard or safety valve in which the fixed or adjustable spring tensioning means is a dual purpose screw type fusible plug, or its equivalent, which in actual practice normally operates in a fixed set position at normal temperatures and secondly melts at a definitely higher temperature to release the tension upon the valve spring, permitting the valve to open and allowing the fluids to drain from the container.

A still further object of my invention is to provide in a drain valve, a unit having a housing for the relief valve spring and to completely enclose it and protect it from exposure to the fluids as well as dust and dirt in the surrounding atmosphere, said housing adapted to be made from round or standard hexagonal bar stock while all the other parts of said unit can be made from round bar stock. All of said parts are adapted to be made on a screw machine and/or a drill press, this being very advantageous because of its simplicity and the ease and low cost of manufacturing.

Another object of my invention is to provide a drain valve in which the peripheral portion of the body is formed with flat sides, whereby a wrench or the like may be used to turn the drain valve housing when installing same into a suitable opening in a fluid container, or threading it into its operative position; this design also allows the cylinder head to be easily gripped with one hand and easily manipulated to operate the actual valve.

Another object of my invention is to provide a drain valve, small in size, but having an exceptionally large drain passage due to arrangement of working parts.

Another object of my invention is to provide a drain valve having a dual purpose valve spring, first a spring made to hold the required amount of pressure, but if said pressure is exceeded the spring will compress, allowing excessive pressure to escape through the drain passage; secondly, said spring is so installed in all modifications of the said valve that it will act as a lock on the cylinder head when the said valve is in a closed position, serving the same purpose and acting as a lockwasher under a nut, this feature being of great benefit if the said valve is placed in equipment that is continually vibrating.

Another object of this invention is to provide a drain valve which can be easily operated by a slight twist and sliding movement for the purpose of quick action, or a valve which can be regulated by a turning movement on a screw thread, for the purpose of adjusting the size of drain aperture required.

Another object of this invention is to provide a drain valve which can be readily constructed from bar stock in a very cheap and efficient manner.

Other objects of this invention will appear hereinafter as the description of this invention proceeds, the novel features, arrangements, and combinations being clearly pointed out in the specification and the claims hereunto appended.

In the drawings:

Fig. 8 shows a full view of a modified form of my drain valve in open position as it would appear installed in a sectional view of a vessel or container.

Fig. 9 is a longitudinal cross-sectional view through the center of one form of my invention as shown in Fig. 8, the cylinder head fitting over a sleeve structure as part of the cylinder, said sleeve having a smooth exterior surface.

Fig. 10 is a longitudinal cross-sectional view through the center of one form of my invention as shown in Fig. 8 with the valve in open position.

Fig. 11 is a full view of my drain valve as shown in Fig. 8 with the valve in closed position, the bottom side turned upwardly to show the drain spout in the body portion thereof.

Fig. 12 is a full rear view of my invention as illustrated in Fig. 8, showing the end that is to be inserted in a container.

Fig. 13 is a full front view of my invention as shown in Fig. 8.

Similar numerals refer to similar parts throughout the several views of my invention.

Figure 1:
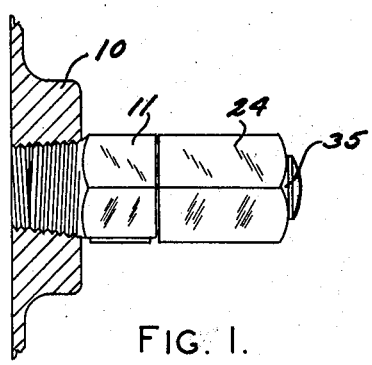
Fig. 1 shows a full view of my drain valve in closed position as it would appear installed in a sectional view of a vessel or container.

In the drawings the character 10 indicates a fragmentary portion of a vessel adapted to receive a valve having a hexagonal valve body 11 provided with a threaded projection 12 for an inlet 14, and a V shaped valve seat 16 located on the inner end of opening 14 forming a seat for a valve 17. Another projection 18 is provided to form a spout with an outlet 20. A third projection 22, aligned with projection 12, is provided to form a cylindrical sleeve for a cylinder head 24, said projection 22 also providing an internal chamber or cylinder 26 for housing certain valve elements.

Within the body 11 there is likewise provided a chamber 28, which is substantially an extension of cylinder 26, for providing an internal bore large enough to accommodate said valve seat 16 and other valve elements.

Figure 2:
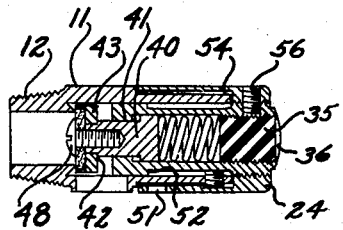
Fig. 2 is a longitudinal cross-sectional view through the center of one form of my invention as shown in Fig. 1.
Figure 3:
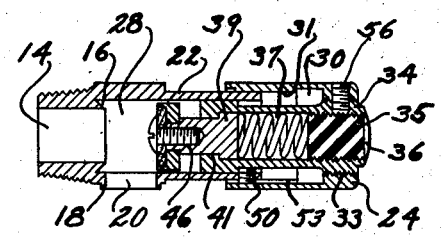
Fig. 3 is a longitudinal cross-sectional view through the center of one form of my invention as shown in Fig. 1, the valve being in open position.

Within the cylinder head 24 is formed the hollow bore 30 with smooth internal wall surface 31 arranged to slide upon the external wall surface of projection 22. The front end of cylinder head 24 is formed with threads 33 to accommodate a threaded piston barrel 34, said barrel also threaded on the front end to accommodate a fusible plug 35 provided with slot 36 across the surface thereof providing means whereby a tool may be inserted for adjusting the position or depth of said plug. The central portion of said barrel 34 is provided with a counterbore 37 to accommodate a safety spring 38 and a head 39 formed on a piston shaft 40. Bore 41 at the rear end of piston barrel 34 acts as a bearing and cooperates with other means to hold the piston shaft head 39 within the barrel. The rear end of piston shaft 39 is provided with an offset portion 42 to receive the removable piston head 43, said piston head having a counterbore 44 to receive a washer 45. The piston shaft 40 is provided with a threaded hole 46 to receive a cap screw 47, said washer 45 having a drilled hole in the center thereof to match the hole 46, the screw head 48 holding said washer and said piston head in position upon said piston shaft 40. A stop screw 50 is threaded into the sleeve 22 to act as a stop to prevent the cylinder head 24 from becoming removed from sleeve 22 when the valve is in open position as shown in Fig. 3, said screw 50 also acting as a lock when the valve is in closed position as shown in Fig. 2, said head 24 being provided with a hole 51 for the purpose of placing said screw 50 in position. Offset 52 adjacent bore 41 acts as a stop for said screw 50 when the valve is in open position. A groove 53 is cut from the back of the cylinder head 24 to form a slide-way for the set screw 50, said groove 53 continuing forwardly to a recess 54 cut in the fore part of the cylinder head 24 for the purpose of locking the cylinder head in position when the valve is closed. A recess 55 is cut at the open end of the cylinder head 24 for manufacturing purposes only. The front end of the cylinder head 24 is drilled and tapped to receive a set screw 56 provided to lock the piston barrel 34 in place and also to prevent the fusible plug 35 from turning after adjustment of same has been made.

From the foregoing description it will be noticed that the valve shown in Figures 1, 2 and 3 works with a sliding movement of head 24 upon sleeve 22 for quick action, and by pressing the cylinder head 24 as far forward as possible and giving a slight turn of said head to the right or left the valve is locked in a closed position.

The compression type spring 38 is made to hold the required amount of pressure and if the pressure within the vessel 10 becomes excessive the valve will open as the spring compresses and thereby allow the high pressure fluid to escape thru passage 20. The dual purpose fusible plug 35 can be moved inwardly and outwardly to act as an adjustment to increase or decrease the spring pressure of spring 38, and in case of fire or excessive heat near said valve the fusible plug will melt and allow the spring 38 to expand thereby removing the spring pressure upon piston shaft head 39 and allowing piston 43 and washer 45 to move away from valve seat 16 allowing the fluid in the vessel 10 to flow therefrom and thru opening 20 arranged at ninety degrees to opening 14. The arrangement of said parts provides an unobstructed passage within the valve and gives exceptionally large fluid discharge passage, for example a ⅜" valve will have a ⅜" pipe thread on the insert end and a ⅜" drain passage completely unobstructed when the valve is open. These features allow a ⅜" safety drain valve of my invention to be substituted for a ½" globe valve which is approximately four times larger than said ⅜" novel valve of my design and invention.

Figure 4:
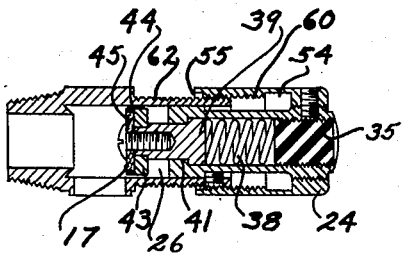
Fig. 4 is a sectional view through the center, same as Fig. 2, except in this design the cylinder head is threaded inside and the cylinder sleeve is threaded on the exterior thereof.
Figure 5:
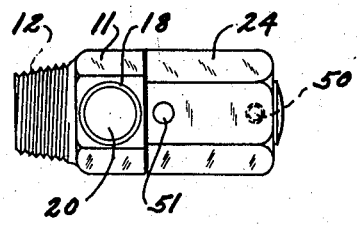
Fig. 5 is a full view of my drain valve in a closed position with the bottom side turned upwardly to show the drain spout in the valve body and also the hole in the cylinder head for the placing of a lock set screw.
Figures 6, 7:
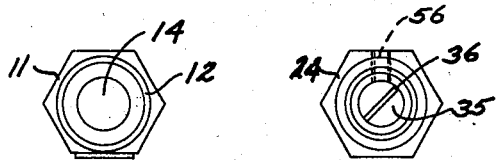
Fig. 6 is a full rear view of my drain valve showing the end that is to be inserted in a container.
Fig. 7 is a full front view of my drain valve showing the cylinder head end.

A modified form of my invention is shown in the drawings as illustrated by Fig. 4; the cylinder 11, cylinder head 24, and similar parts are identical and carry similar numerals. The internal wall surface of cylinder head 24 is formed with threads 60 and arranged to fit with threads 62 formed upon the exterior surface of cylinder sleeve or projection 22. This type of drain valve provides a valve 17 rotatable about an axis substantially concentrically arranged with respect to the axis of rotation of head 24 upon sleeve 22 and being longitudinally slidable thereto, said shaft 40 sliding within bearing 41 arranged in piston barrel 34, the spring 38 urging said valve 17 against valve seat 16 in a direction towards the seat; the fusible plug 35 forming an adjustable spring pressure means as well as a safety device as described above. This modification as shown in Fig. 4 functions substantially the same as the valve shown in Figures 1, 2 and 3 except it provides a regulated action and means to regulate the size of valve opening when the valve 17 is not desired to be in full open position while fluid is being drained from the vessel 10.

In Figures 8, through 13 inclusive, a modified form of my drain valve is shown, said figures showing a drain valve substantially the same as described above and mutually cooperative to produce a single result. Character 10 indicates the vessel, characters 11, 12, 14, 16, 17, 18, 20, 22, 24, 26, 28, 30, 31, 32, 45, 46, 47, 48, 50, 51, 53, and 55 indicate similar parts as described above. Sleeve 22 formed on the body 11 to act as a guide for the cylinder head 24 has an internal bore large enough to accommodate the valve 17, a safety spring 65, and other moving parts cooperative therewith.

The cylinder head 24 is threaded at 66 to accommodate a threaded fusible collar 67 placed on shaft 68 formed upon the front end of piston barrel 69, said collar being secured to said shaft 68 by a pin 70. Said head 24 is provided with screw 71 to lock the piston barrel 69 and collar 67 in position, once said collar is adjusted to give the desired tension to spring 65. Recess 72 is cut in the fore part of the cylinder head 24 for the purpose of locking the cylinder head 24 in a closed position as shown in Fig. 9.

The piston barrel 69 is provided with a counterbore 73 to act as a bearing and means to keep the piston head 74 of piston 75 in place. A set screw 76 is threaded into the piston barrel 69 to prevent the piston 75 from becoming removed from the barrel 69. The piston head 75 is counterbored to receive the common washer 45 held in place by screw 47 with head 48, said screw 47 being held in threaded hole 46 in the piston head 75. Spring 65 is of the compression type and made to compress at a specified amount of pressure, said spring being located between piston head 75 and offset 77 on barrel 69 causing valve 17 to be urged in a direction toward and against valve seat 16. Said offset 77 is also provided to act as a stopping means to act against stop screw 50 when the cylinder head 24 is moved to open position as shown in Fig. 10. A recess 78 is provided in the piston shaft adjacent to the piston head 74 to accommodate the end of set screw 76 and act as a stop therefor.

It will thus become evident that a safety drain valve which will absolutely operate at predetermined pressures has been provided but that there is also incorporated in this embodiment a valve small in size and compactness of parts making the said valve highly useful to the extent that it can be substituted for three fittings as normally used to do the same work. Also, the modern and novel design leaves no outside interferences for placing of the valve is a limited amount of space, still allowing the valve to be worked with ease. Convenience and arrangement of parts makes possible the replacement of any working part liable to wear, as for instance the inexpensive packing of the valve can be replaced by simply removing the entire cylinder head, and parts attached thereto as a unit, removing packing screw 47 and replacing same.

It will also be evident that the construction shown makes the valve inexpensive to manufacture. The springs, packing, screws and minor parts, due to smallness in size, can be cheaply purchased or made. All other parts can be made from standard hexagonal or round bar stock on a screw machine or drill press; this means a saving in the cost of patterns and castings or expensive fixtures required for machining of castings. The simple arrangement of parts makes the valve easily assembled.

I have borne in mind that the said valve may be designed to suit many other purposes other than pressure vessels, still applying the characteristics and features of said valve and that some changes may be made in the construction and arrangement of the parts of my device without departing from the real spirit and purpose of my invention, and it is my intention to cover by my claims any modified forms of structure, or use of mechanical equivalents, which may be reasonably included within its scope.

Having thus described my invention, what I claim as new and desire to protect by Letters Patent, is:

1. A drain valve of the class described incorporating a relief valve, comprising a valve body, a spout, a valve and valve actuating means; said valve body having aligned openings, one of which forms a valve seat and the other of which forms a smooth cylindrical guide; a valve actuating member slidably mounted within said cylindrical guide, whereby the same is advanced longitudinally upon actuation thereof in a direction toward and from said seat; a valve on said actuating member rotatable about an axis substantially concentrically arranged with respect to the axis of rotation of said member and being longitudinally slidable relative thereto; a spring for urging said valve relative to said member in a direction toward the seat; a stop for limiting the movement of said valve on said actuating member under the influence of said spring, whereby said valve can be retracted from said seat upon actuation of said actuating member; the spring being so arranged that its tension remains substantially the same while said valve is being opened and closed upon actuation of said actuating member; said actuating member having a laterally extending flange portion thereon supporting a longitudinally extending cylindrical member for surrounding said cylindrical guide; said cylindrical member being arranged to firmly contact said guide, and arranged with means to lock said valve actuating member in position when said valve is fully closed, while leaving said valve free to act as a pressure relief valve and open said valve port when the discharge pressure is greater than the normally set spring pressure.

2. A drain valve of the class described incorporating a relief valve, comprising a valve body, a spout, a valve and valve actuating means; said valve body having aligned openings, one of which forms a valve seat and the other of which forms a smooth cylindrical guide; a valve actuating member slidably mounted within said cylindrical guide, whereby the same is advanced longitudinally upon actuation thereof in a direction toward and from said seat; a valve on said actuating member rotatable about an axis substantially concentrically arranged with respect to the axis of rotation of said member and being longitudinally slidable relative thereto; a spring for urging said valve relative to said member in a direction toward the seat; a stop for limiting the movement of said valve on said actuating member under the influence of said spring, whereby said valve can be retracted from said seat upon actuation of said actuating member; the spring being so arranged that its tension remains substantially constant while said valve is being opened and closed upon actuation of said actuating member; said spring loaded valve forming a pressure relief valve when said valve is in closed position and after the valve actuating means has been moved its maximum distance during or after closing said valve port, said actuating member having a laterally extending flange portion thereon supporting a longitudinally extending cylindrical member for surrounding said cylindrical guide; said cylindrical member being arranged to firmly contact said guide, and arranged with means to lock said valve actuating member in position when said valve is fully open without changing the normally set spring pressure.

3. A drain valve of the class described incorporating a relief valve, comprising a valve body, a spout, a valve and valve actuating means; said valve body having aligned openings, one of which forms a valve seat and the other of which forms a smooth cylindrical guide; a valve actuating member slidably mounted within said cylindrical guide, whereby the same is advanced longitudinally upon actuation thereof in a direction toward and from said seat; a valve on said actuating member rotatable about an axis substantially concentrically arranged with respect to the axis of rotation of said member and being longitudinally slidable relative thereto; a spring for urging said valve relative to said member in a direction toward the seat; a stop for limiting the movement of said valve on said actuating member under the influence of said spring, whereby said valve can be retracted from said seat upon actuation of said actuating member; the spring being so arranged that its tension remains substantially constant with any position of the actuating means, said actuating member having a laterally extending flange portion thereon supporting a longitudinally extending cylindrical member for surrounding said cylindrical guide; said cylindrical member being arranged to firmly contact said guide, and said cylindrical member forming manually operable means for moving said valve actuating member longitudinally within said cylindrical guide to positively open, resiliently close or place said valve in a position intermediate of said closing position and said open position, the valve acting as a pressure valve in said closed position.

4. A drain valve of the class described incorporating a pressure relief valve, comprising a valve body, a spout, a valve and valve actuating means; said valve body having aligned openings, one of which forms a valve seat and the other of which forms a smooth cylindrical guide; a valve actuating member slidably mounted within said cylindrical guide; whereby the same is advanced longitudinally upon actuation thereof in a direction toward and from said seat; a valve on said actuating member rotatable about an axis substantially concentrically arranged with respect to the axis of rotation of said member and being longitudinally slidable relative thereto; a spring for urging said valve relative to said member in a direction toward the seat; a stop for limiting the movement of said valve on said actuating member under the influence of said spring, whereby said valve can be retracted from said seat upon actuation of said actuating member; the spring being so arranged that its tension remains substantially the same with any position of the actuating means, said cylindrical guide member having a threaded exterior wall, said actuating member having a laterally extending flange portion thereon supporting a longitudinally extending cylindrical member with threaded interior walls arranged to surround and contact said guide, whereby the same is advanced longitudinally upon rotation thereof, and arranged to secure said valve actuating member in position when said valve is fully closed without changing the normal tension of said spring.

5. A drain valve of the class described incorporating a pressure relief valve, comprising a valve body, a spout, a valve and valve actuating means; said valve body having aligned openings, one of which forms a valve seat and the other of which forms a smooth cylindrical guide; a valve actuating member slidably mounted within said cylindrical guide; whereby the same is advanced longitudinally upon actuation thereof in a direction toward and from said seat; a valve on said actuating member rotatable about an axis substantially concentrically arranged with respect to the axis of rotation of said member and being longitudinally slidable relative thereto; a spring for urging said valve relative to said member in a direction toward the seat; a stop for limiting the movement of said valve on said actuating member under the influence of said spring, whereby said valve can be retracted from said seat upon actuation of said actuating member; the spring being so arranged that its tension remains substantially the same with any position of the actuating means; said cylindrical guide member having a threaded exterior wall, said actuating member having a laterally extending flange portion thereon supporting a longitudinally extending cylindrical member with threaded interior walls arranged to surround and contact said guide, whereby the same is advanced longitudinally upon rotation thereof, and arranged to secure said valve actuating member in position when said valve is fully open without changing the normal predetermined spring pressure.

6. A drain valve of the class described incorporating a relief valve, comprising a valve body, a spout, a valve and valve actuating means; said valve body having aligned openings, one of which forms a valve seat and the other of which forms a smooth cylindrical guide; a valve actuating member slidably mounted within said cylindrical guide, whereby the same is advanced longitudinally upon actuation thereof in a direction toward and from said seat; a valve on said actuating member rotatable about an axis substantially concentrically arranged with respect to the axis of rotation of said member and being longitudinally slidable relative thereto; a spring positioned between said valve and said valve actuating member for urging said valve relative to said member in a direction toward said seat, a stop for limiting the movement of said valve on said actuating member under the influence of said spring, whereby said valve can act as a relief valve when in closed position and can be retracted from said seat upon actuation of said actuating member; the spring being so arranged that its tension remains substantially the same with any position of the actuating means; said actuating member having a laterally extending flange portion thereon supporting a longitudinally extending cylindrical member for surrounding said cylindrical guide; said cylindrical member being arranged to firmly contact said guide, and arranged with means to lock said valve actuating member in position when said valve is fully closed without changing the normal predetermined tension of said spring.

7. A drain valve of the class described incorporating a relief valve, comprising a valve body, a spout, a valve and valve actuating means; said valve body having aligned openings, one of which forms a valve seat and the other of which forms a smooth cylindrical guide; a hollow valve actuating member slidably mounted within said cylindrical guide; whereby the same is advanced longitudinally upon actuation thereof in a direction toward and from said seat; a valve on said actuating member rotatable about an axis substantially concentrically arranged with respect to the axis of rotation of said member and being longitudinally slidable relative thereto, a spring positioned within said hollow member for urging said valve relative to said member in a direction toward the seat; a stop for limiting the movement of said valve on said actuating member under the influence of said spring, whereby said valve can be retracted from said seat upon actuation of said actuating member; the spring being so arranged that its tension remains substantially the same with any position of the actuating means, said actuating member having a laterally extending flange portion thereon supporting a longitudinally extending cylindrical member for surrounding said cylindrical guide; said cylindrical member being arranged to firmly contact said guide and arranged with means to lock said valve actuating member in position when said valve is fully closed without changing the normal predetermined tension of said spring.

8. A drain valve of the class described incorporating a relief valve and a safety element, comprising a valve body, a spout, a valve and valve actuating means; said valve body having aligned openings, one of which forms a valve seat and the other of which forms a smooth cylindrical guide; a hollow valve actuating member slidably mounted within said cylindrical guide; whereby the same is advanced longitudinally upon actuation thereof in a direction toward and from said seat; a valve on said actuating member rotatable about an axis substantially concentrically arranged with respect to the axis of rotation of said member and being longitudinally slidable relative thereto; a spring for urging said valve relative to said member in a direction toward the seat; a stop for limiting the movement of said valve on said actuating member under the influence of said spring, whereby said valve can be retracted from seat upon actuation of said actuating member; the spring being so arranged that its tension remains substantially the same with any position of the actuating member; said actuating member having a laterally extending flange portion thereon supporting a longitudinally extending cylindrical member for surrounding said cylindrical guide; said cylindrical member being arranged to firmly contact said guide, the end wall of said hollow member being closed with a safety element comprising a fusible plug, and said hollow member having means to lock said valve actuating member in position when said valve is fully closed without changing the normal set tension of said spring.

9. In combination, a drain valve incorporating a relief valve, having a valve casing, an inlet port in one end, an outlet port in one side, and a hollow cap member closing the opposite end, a valve seat provided between the said inlet and said outlet; a valve adapted to seat in said valve seat; a valve control means mounted in and movable longitudinally of said valve casing; a resilient spring for urging said valve toward said seat; a stop for limiting the movement of said valve on said valve control means under the influence of said spring, said valve being rotatable about an axis substantially concentrically arranged with respect to the axis of rotation of said valve control means, said hollow cap forming manually operable means for moving said valve control means longitudinally of said valve casings to positively open, resiliently close, or place said valve in a position intermediate of said closing position and said open position, and in said closed position the valve will act as a relief valve and will be automatically operated by the relative pressure on the inlet and outlet sides of the valve, the spring being so arranged that its tension remains substantially the same with any position of the valve control means.

10. In a device of the class described, a drain valve incorporating a relief valve and a safety element; comprising a valve body, a spout, a valve and a manually operable valve actuating means; said valve body having aligned openings, one of which forms a valve seat and the other of which forms a smooth cylindrical guide; a hollow end section, having on the inside thereof a thread cooperating with a thread on the valve body for opening and closing the valve upon rotation of said hollow end section, said hollow end section having integrally connected therewith a hollow valve actuating member reciprocably mounted in said guide, a small valve stem attached to the valve and extending into said actuating member, a head on said stem to prevent it being withdrawn from said hollow actuating member, a spiral spring in said hollow actuating member operating on the head of the stem, and a fusible adjusting screw in the outer end of the actuating member operating on the said spiral spring for regulating the pressure of said spring, and forming a safety spring relief device for said drain valve; a stop for limiting the movement of said valve on said actuating member under the influence of said spring, said spring being so arranged that its tension remains the same throughout the travel of, or in any position of said actuating member after it is once set by said adjusting screw.

11. In a device of the class described, a drain valve incorporating a relief valve and a safety element; comprising a valve body, a spout, a valve and a manually operable valve actuating means; said valve body having aligned openings, one of which forms a valve seat and the other of which forms a smooth cylindrical guide, said guide being closed by a hollow head having a fusible member incorporated therewith, a valve actuating member slidably mounted within said cylindrical guide, whereby the same is advanced longitudinally upon actuation thereof in a direction toward and from said seat; said valve on said actuating member rotatable about an axis substantially concentrically arranged with respect to the axis of rotation of said actuating member and being longitudinally slidable relative thereto; a spring for urging said valve relative to said actuating member in a direction toward the seat, said fusible member forming an adjusting screw operating on said spring for regulating the pressure of said spring, a stop for limiting the movement of said valve on said actuating member under the influence of said spring, whereby said valve can be retracted from said seat upon actuation of said actuating member; the spring being so arranged that its tension remains constant with any position of the valve actuating member, said actuating member having a laterally extending flange portion thereon supporting a longitudinally extending cylindrical member for surrounding said cylindrical guide; said cylindrical member being arranged to firmly contact said guide, and arranged with means to lock said valve actuating member in position when said valve is fully closed, leaving said valve under spring tension to act as a relief valve.

12. In a drain valve incorporating a relief valve and a safety element; comprising a valve body with an inlet and an outlet part, a valve and valve actuating means; said valve body having aligned openings, one opening forming an inlet part with a valve seat and the other opening forming a smooth guide passage, a valve with a stem cooperating with said inlet part and said seat, a spiral spring acting normally to hold the valve head in closed position relative to said inlet part, a closed rotative cap threaded to the valve housing, means connecting said cap with said valve stem responsive to rotary movement of the cap to effect longitudinal movement of the stem and valve, the spring being so arranged that its tension remains substantially the same during the travel of, or with any position of the valve connecting means, an adjustable, fusible plug engaging one end of said spring for regulating the pressure of said spring, a stop for limiting the movement of said valve on said connecting means under the influence of said spring, and said valve designed to be unseated when the discharge pressure is greater than the normally set spring pressure.

13. In a drain device forming a combined relief valve and safety element, a valve body having aligned openings, one of which forms a valve seat and the other a smooth cylindrical passageway, a valve and valve stem rotatably and longitudinally slidably mounted within said housing to cooperate with said seat to close the same, a spring for projecting said valve toward said valve seat, a rotative cap member threaded to the exterior surface of said valve body and at the cylindrical passage end thereof, and means connecting said valve with said cap responsive to rotary movement of the cap to advance said valve and stem toward or away from a closing position, a stop for limiting the movement of said valve on said means under the influence of said spring, the spring being so arranged that its tension remains constant throughout the travels of said valve connecting means, a fusible adjusting plug in said connecting means engaging one end of said spring for regulating the pressure of said spring normally and in case of excessive heat to allow said spring to expand and relieve the tension on the valve.

14. A drain device forming a combined relief valve and safety element, comprising two units, one unit including a one piece valve body having aligned openings and an outlet port arranged at 90 degrees thereto, one of said openings forming a valve seat and the other of which forms a smooth cylindrical guide; the second unit having parts including a valve with a valve actuating member slidably mounted within said cylindrical guide, a spring for urging said valve relative to said member in a direction toward said seat, a stop for limiting the movement of said valve on said actuating member under the influence of said spring, said parts being assembled together whereby the tension of said spring and adjustments of said parts will remain constant throughout the travel of said valve actuating means or the complete removal of said second unit from said first unit for inspection; said second unit being easily replaced so that said valve will rest against said valve seat without changing the predetermined spring tension upon said valve.

15. The combination, with a drain valve incorporating pressure a relief valve and a safety element, consisting of two units, one unit including a valve body having aligned openings and an outlet port arranged at 90 degrees thereto, one of said openings forms a valve seat and the other of which forms a smooth cylindrical guide; the second unit having parts including a valve with a valve actuating member slidably mounted within said cylindrical guide, a spring for urging said valve relative to said member in a direction toward said seat, a stop for limiting the movement of said valve on said actuating member under the influence of said spring, said parts being assembled together whereby the tension of said spring and adjustments of said parts will remain constant throughout the travel of said valve actuating means or the complete removal of said second unit from said first unit for inspection; locking means arranged between said first and second units, said second unit being easily locked in position to close said valve upon said valve seat without interfering with or preventing the spring loaded valve from acting as a relief valve, and said second unit incorporating a fusible plug to release said normal spring pressure in case of excessive pressure to allow said spring to release said valve and open said valve port; said second unit being easily replaced so that said valve will rest against said valve seat without changing the predetermined spring tension upon said valve.

PAUL W. BROWER.